United States Patent Office

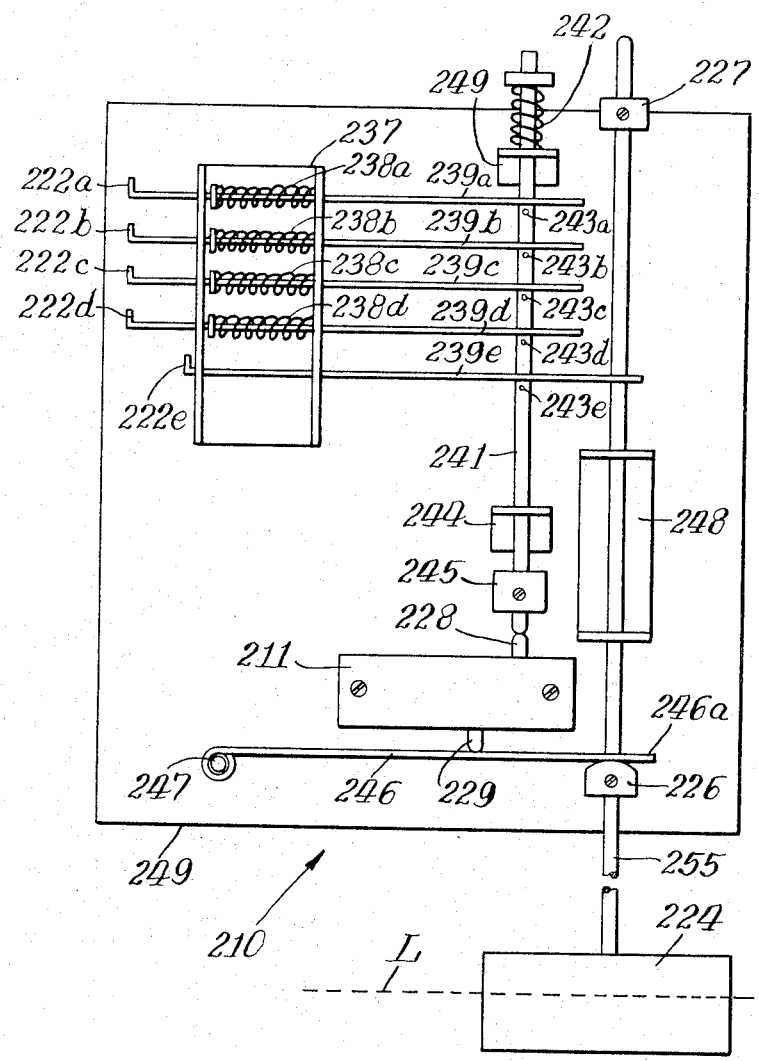

3,374,326
Patented Mar. 19, 1968

3,374,326
CONTROL RESPONSIVE TO VARIATIONS IN LIQUID LEVELS
David C. Eisendrath, Chicago, Ill., assignor to Cory Corporation, a corporation of Delaware
Original application Oct. 21, 1965, Ser. No. 499,307, now Patent No. 3,297,844. Divided and this application Aug. 18, 1966, Ser. No. 573,319
8 Claims. (Cl. 200—84)

ABSTRACT OF THE DISCLOSURE

A control for providing a signal corresponding to a variation in a liquid level wherein a plurality of vertically spaced adjustbly positionable actuators are arranged to be selectively movable from a retracted position to an operating position for engagement by a float operated structure to control a switch, whereby the switch is operated at any selected one of a plurality of different levels of the liquid corresponding to the selected one of the actuators. The control is useful in selecting different quantities of water to be delivered to a coffee brewing apparatus as for making different numbers of cups of coffee.

---

This application comprises a divisional of my copending application Ser. No. 499,307, filed Oct. 21, 1965, now Patent No. 3,297,844.

This invention relates to control devices and in particular to controls for providing a signal responsive to a variation in a liquid level for use in apparatus such as coffee brewing apparatus.

In one form of coffee brewing apparatus, water is heated in a tank and a preselected quantity thereof is discharged through a suitable brewing means for brewing a preselected quantity of beverage such as coffee. The amount of water delivered from the tank is controlled by a float operated means responsive to the level of the water in the tank so that when the level drops a preselected amount from a full level suitable switches are operated to discontinue the delivery of the hot water from the tank and permit the refilling of the tank with cold water for subsequent heating and use in further brewing operations. The present invention is concerned with an improved control for use with such a float operated delivery means which permits ready adjustability of the quantity of hot water delivered from the tank.

Thus, a principal feature of the present invention is the provision of a new and improved control for providing a signal responsive to a variation in a liquid level.

Another feature of the invention is the provision of such a control having new and improved means for providing facilitated adjustability in the amount of liquid delivered from a tank as a function in the change in liquid level thereof.

A further feature of the invention is the provision of such a control which is extremely simple and economical of construction while yet providing long trouble-free life.

Still another feature of the invention is the provision of such a control having new and improved means for operating a switch thereof at any one of a plurality of preselected levels.

A further feature of the invention is the provision of such a control including a control switch, first operator means for operating said switch as a result of movement of the means relative to the switch, second operator means movable as a function of variations in the liquid level and including means for moving the first operator means in response to a variation in the liquid level, and adjustable means for causing the first operator means to operate the switch selectively as the result of any one of a plurality of different amounts of movement of the second operator means.

Other features and advantages of the invention will be apparent from the following description taken in connection with the accompanying drawing wherein the figure is a schematic elevation of a control embodying the invention.

In the exemplary embodiment of the invention as disclosed in the drawing, a control generally designated 210 is shown to include a switch 211 carried on a plate 249. The control switch 211 includes an upper operator 228 and lower operator 229. The lower operator is actuated by an arm 246 pivotally connected to the plate 249 by a pivot 247 and having an end portion 246a disposed superjacent a collar 226 on the rod 225 upstanding from float 224. Thus, when the level L rises to the preselected high level, the collar 226 pivots the arm in a counterclockwise direction to actuate the operator 229 and operates switch 211 in this mode of operation.

The control of the lower level of liquid in control 210 is by means of selective push-button 222a, 222b, 222c, and 222d provided at one end of leaf springs 239a, 239b, 239c and 239d, respectively. The push-buttons are biased to a released position by suitable springs 238a, 238b, 238c and 238d, respectively. The float rod 225 is provided with an upper collar 227 which in moving downwardly with the float during a descending liquid level condition will strike a selected one of the springs 239a–239d depending on which push-button has been depressed to move the spring to the right as seen in the figure to subjacent the collar 227. The springs extend respectively superjacent a plurality of pins 243a, 243b, 243c and 243d provided on an operator rod 241 biased in an upward direction by a spring 242 and provided at its lower end by an actuator 245 arranged to engage upper operator 228 of switch 211. Thus, when collar 227 moves downwardly against a selected one of the leaf springs, it forces the spring downwardly against its associated pin to move the rod 241 downwardly with the float 224 and cause the actuator 245 to move operator 228 and thereby operate switch 211. Illustratively, if a relatively high level corresponding to a small quantity of dispensed water is desired, the operator merely pushes the upper push-button 222a so as to dispose the leaf spring 239a in the path of movement of collar 227. The downward movement of the collar then presses the spring 239a against the pin 243a so as to actuate switch 211 at a relatively high level of the liquid. Obviously, the three other push-buttons illustrated provide for operation of the switch 211 at progressively lower discrete positions of the liquid level. A lowermost leaf spring 239e is provided with a push-button 222e arranged to be disposed in a depressed position at all times so as to provide a lowermost control of the switch 211 assuring the discontinuance of the lowering of the liquid level when the collar 227 reaches the preselected lowermost position corresponding to the position of the leaf spring 239e.

The rod 225 may be suitably vertically, slidably mounted in a carrier 248 and the rod 241 may be suitably vertically, slidably mounted in a pair of mounts 240 and 244. The coil springs 238a–238d and leaf springs 239a may be suitably mounted in a mount 237. The particular spring and push-button arrangement is illustrative only, it being obvious to those skilled in the art that many other similar structures may be equivalently employed in following the structural concept embodied in the invention.

Thus, control 210 provides for discrete liquid levels, while providing for adjustable level control in a novel and simple manner with each of the lowermost and uppermost levels being selectively controlled.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A control for providing a signal responsive to a variation in a liquid level, comprising:
   a control switch;
   operating means for fixedly mounting said switch;
   means for operating said switch as the result of a preselected movement thereof; and
   means for moving said operating means including a plurality of vertically spaced, adjustably positionable actuators selectively movable from a retracted position to an operating position each of said actuators being arranged to be selectively moved and resultingly move said operating means to operate said switch, and movable means for engaging a selected one of said actuators in said operating position to effect switch operating movement of said operating means as a result of a variation in the liquid level whereby said switch is operated at any selected one of a plurality of different levels of the liquid corresponding to the selected one of said actuators.

2. The control of claim 1 including means for manually adjusting the actuator to be selectively engaged by said movable means.

3. The control of claim 1 including means for manually adjusting the actuator to be selectively engaged by said movable means and means for biasing said actuators to preclude engagement thereof by said movable means.

4. The control of claim 1 further including an actuator for moving said operating means whenever said level reaches a preselected low level.

5. The control of claim 1 wherein said operating means comprises a first member having a plurality of vertically spaced shoulders and said actuators comprise a plurality of second members selectively engaging one each of said shoulders and adjustably positionable to be selectively disposed in the path of movement of said movable means for moving the first member when said movable means engages and moves the second member adjusted to be in said path of movement.

6. The control of claim 5 wherein said shoulders are defined by a plurality of pins on said first member.

7. The control of claim 5 including means for biasing said first member to a retracted position.

8. The control of claim 1 including a lever, means for pivotally mounting said lever adjacent said switch, and means carried by said movable means for providing said lever to operate said switch in a sense opposite the sense in which the switch is pivoted by said actuators, as the result of the liquid level reaching a preselected high level.

References Cited

UNITED STATES PATENTS

| | | | |
|---|---|---|---|
| 1,005,111 | 3/1911 | Fieseler | 200—84 |
| 1,188,822 | 6/1916 | Peters | 200—84 X |
| 2,465,516 | 3/1949 | Colyer et al. | 200—84 |
| 2,719,889 | 10/1955 | Miller | 200—153 X |
| 2,789,176 | 4/1957 | Mercier | 200—153 X |
| 2,735,909 | 2/1956 | Floyd et al. | 200—84 |
| 3,097,273 | 7/1963 | Denner | 200—153 |

BERNARD A. GILHEANY, *Primary Examiner.*

H. A. LEWITTER, R. COHRS, *Assistant Examiners.*

PO-1050
(5/69)

UNITED STATES PATENT OFFICE
CERTIFICATE OF CORRECTION

Patent No. 3,374,326          Dated    March 19, 1968

Inventor(s) DAVID C. EISENDRATH

It is certified that error appears in the above-identified patent and that said Letters Patent are hereby corrected as shown below:

In claim 1, line 4, cancel "operating", and in line 5, add the word -- operating -- before "means".

SIGNED AND
SEALED

OCT 28 1969

(SEAL)
Attest:

Edward M. Fletcher, Jr.                    WILLIAM E. SCHUYLER, JR.
Attesting Officer                          Commissioner of Patents